United States Patent [19]

Bills, Jr. et al.

[11] Patent Number: 5,094,583
[45] Date of Patent: Mar. 10, 1992

[54] MAIN TAIL LOCKING DEVICE FOR A TRAILER

[75] Inventors: Joseph W. Bills, Jr.; William K. Hunt; Harry E. Voelzke, all of Mitchell, S. Dak.

[73] Assignee: Dakota Manufacturing Co., Inc., Mitchell, S. Dak.

[21] Appl. No.: 572,912

[22] Filed: Aug. 24, 1990

[51] Int. Cl.⁵ .............................................. B65G 67/02
[52] U.S. Cl. ...................................... 414/537; 414/480; 298/17 B; 92/15; 92/28
[58] Field of Search ............... 414/480, 537, 538, 722, 414/727; 298/38, 17 B, 23 MD; 92/15, 27, 28, 23

[56] References Cited

U.S. PATENT DOCUMENTS

| | | | |
|---|---|---|---|
| 1,705,968 | 3/1929 | Eisenhut | 298/38 X |
| 3,003,472 | 10/1961 | Ferris et al. | 92/28 X |
| 3,783,976 | 1/1974 | Kerr | 92/15 X |
| 4,318,658 | 3/1982 | McIntyre | 414/480 |
| 4,352,626 | 10/1982 | Frisbee et al. | 298/17 B X |
| 4,373,851 | 2/1983 | Confoey | 298/17 B X |
| 4,568,235 | 2/1986 | Bills, Jr. | 414/477 |

FOREIGN PATENT DOCUMENTS

| | | | |
|---|---|---|---|
| 2344511 | 9/1974 | Fed. Rep. of Germany | 298/17 B |
| 1565116 | 1/1980 | United Kingdom | 414/537 |

Primary Examiner—Frank E. Werner
Attorney, Agent, or Firm—Zarley McKee Thomte Voorhees & Sease

[57] ABSTRACT

A main tail lock for a hydraulic tail trailer comprising a pair of spaced-apart locks which are pivotally secured to the frame of the tail and which are pivoted between locked and unlocked positions by a lock cylinder. When the locks are in their unlocked position, the tail cylinders for the tail may raise or lower the tail of the trailer. When the locks are in their locked position, the tail cylinders are prevented from retracting thereby preventing the lowering of the tail with respect to the main frame of the trailer.

3 Claims, 4 Drawing Sheets

MAIN TAIL LOCKING DEVICE FOR A TRAILER

BACKGROUND OF THE INVENTION

The trailer transportation of heavy farm and industrial equipment requires special loading ramps at the rear end of the trailer. For example, FIG. 1 of U.S. Pat. No. 4,372,727 illustrates a typical prior art trailer wherein a hinged ramp or tail is raised or lowered by a pair of hydraulic cylinders. The hydraulic cylinders are pivotally connected to the tail to permit the tail to be lowered into ground engagement so that the heavy equipment nay be moved onto the bed of the trailer. When the equipment has been loaded onto the trailer, the hydraulic cylinders for the tail are extended to raise the tail to a substantially horizontally disposed condition. Normally, the tail will be supporting at least a portion of the equipment positioned on the trailer. Should the hydraulic cylinders for the tail fail, the tail will pivot downwardly relative to the trailer which could cause damage to the equipment being transported and which would constitute a safety hazard as well.

In an effort to prevent the trailer tail from moving downwardly in the case of failure of the hydraulic cylinders or the hydraulic lines connected thereto, separate locking structures have been utilized to prevent the retraction of the tail hydraulic cylinders. However, the separate locking structures are normally quite complex and do substantially increase the cost of manufacturing the trailer.

It is therefore a principal object of the invention to provide a main tail locking device for a hydraulic tail trailer.

A further object of the invention is to provide a main tail lock for a hydraulic tail trailer which is less complex than the prior art devices and which is less expensive to manufacture than the prior art devices.

Yet another object of the invention is to provide a main tail lock for a hydraulic tail trailer which prevents the hydraulic tail from pivoting downwardly should the tail hydraulic cylinders fail.

These and other objects will be apparent to those skilled in the art.

SUMMARY OF THE INVENTION

Figure 1:
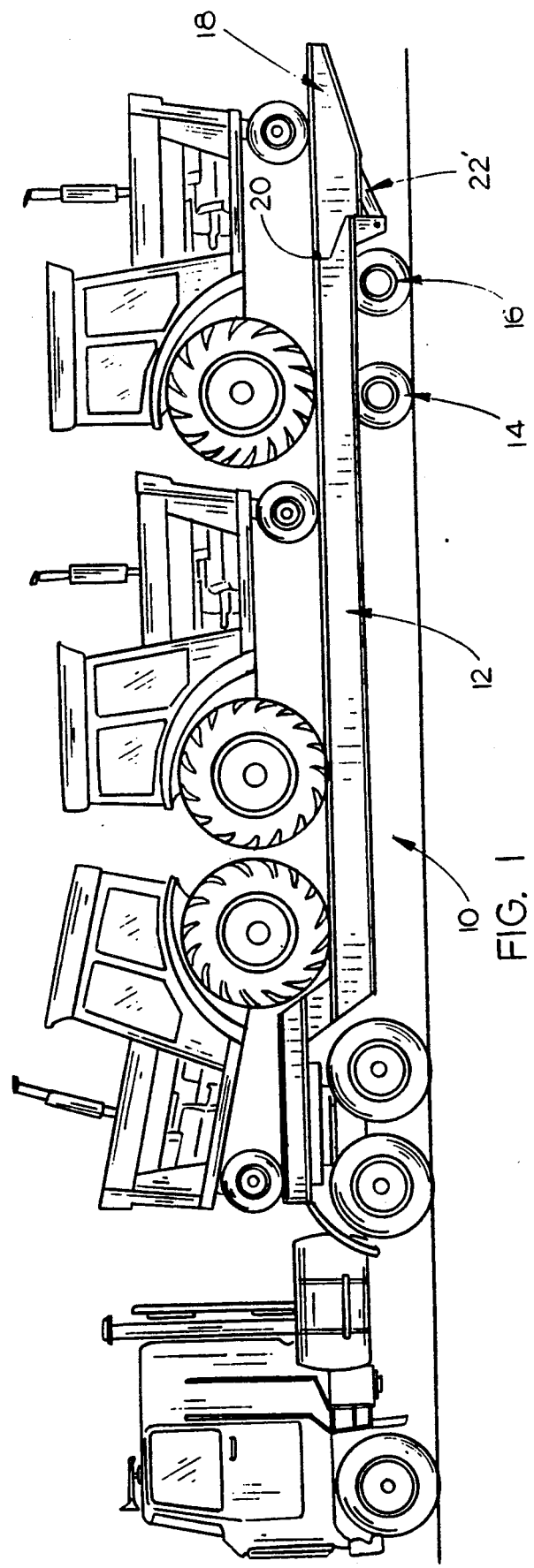
FIG. 1 is a side view of a trailer having a main tail pivotally mounted at the rearward end thereof.
Figure 2:
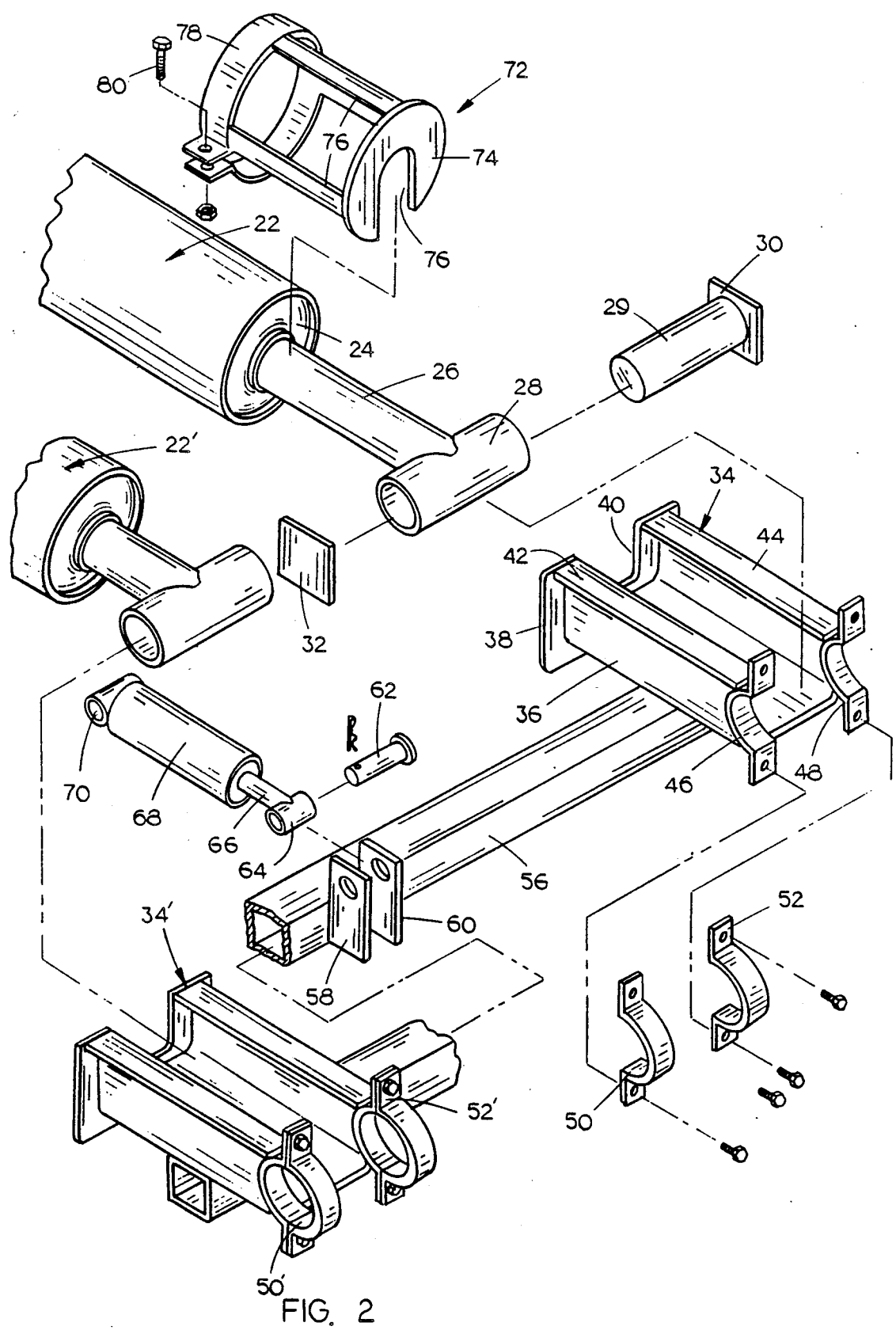
FIG. 2 is a partial exploded perspective view of the main tail lock of this invention.

A locking device for hydraulic tail trailers is described The trailer main tail is pivotally connected at its forward end to the rearward end of the main trailer bed and is pivotally movable with respect thereto by a pair of hydraulic cylinders which are pivotally connected at their base ends to the main frame of the trailer and which have their cylinder rods pivotally connected to the frame of the tail. A locking cylinder is pivotally connected at its rearward end to the frame of the tail and is pivotally connected at its rod end to a transversely extending tubular member. A lock is secured to the opposite ends of the tubular member. The rearward end of each of the locks are pivotally connected to the pivotal connection of the rod end of the hydraulic cylinders for the tail so that extension and retraction of the lock cylinder causes the locks to pivotally move between locked and unlocked conditions. When the locks are in their locked position, they are positioned between the gland end of the associated hydraulic cylinder and the pivotal connection of the rods of the hydraulic cylinders with the frame of the tail to prevent the retraction of the tail hydraulic cylinders should the tail hydraulic cylinders, or the hydraulic hoses associated therewith, fail. Means is also provided on the tail hydraulic cylinders to dissipate forces applied to the gland end of the cylinder by the associated lock.

DESCRIPTION OF THE PREFERRED EMBODIMENT

Referring to the drawings, the numeral 10 refers to a conventional trailer including a main frame means 12 having a pair of wheel assemblies 14 and 16 at the rearward end thereof. A hydraulic tail 18 is pivotally connected to the rearward end of frame means 12 at 20 which is located rearwardly of the axle assemblies of the wheel assemblies. A pair of tail hydraulic cylinders 22 and 22' are pivotally connected at their base ends to frame means 12 as seen in the drawings. Inasmuch as tail hydraulic cylinders 22 and 22' are identical, only hydraulic cylinder 22 will be described in detail with the designation "'" being utilized to indicate identical structure on hydraulic cylinder 22'.

Hydraulic cylinder 22 includes a gland end 24 through which extends cylinder rod 26. A transversely extending collar 28 is secured to the rearward end of rod 26 with the collar 28 being operatively pivotally secured to shaft 29 extending between plates 30 and 32 which are secured to the framework of tail 18. Thus, extension of the rods 26 and 26, from the cylinders 22 and 22' respectively will cause the tail 18 to pivotally move upwardly relative to frame means 12. Conversely, retraction of the rods 26 and 26' into the cylinders 22 and 22' will cause the tail 18 to pivot downwardly relative to frame means 12.

Locks 34 and 34' are operatively pivotally mounted on the shafts 28 and 28' respectively. Inasmuch as locks 34 and 34, are identical, only lock 34 will be described in detail. Lock 34 includes a channel-shaped member 36 having an end plate 38 welded to one end thereof which has an opening 40 formed therein. A pair of straps 42 and 44 are welded to the upper ends of the legs of the channel 36 as seen in the drawings and have clamp portions 46 and 48 secured to the rearward ends thereof. Clamp portions 50 and 52 are adapted to be secured to the clamp portions 46 and 48 respectively by bolts extending therethrough so that the clamp portions will rotatably embrace shaft 29 at the opposite ends thereof.

Figure 3:
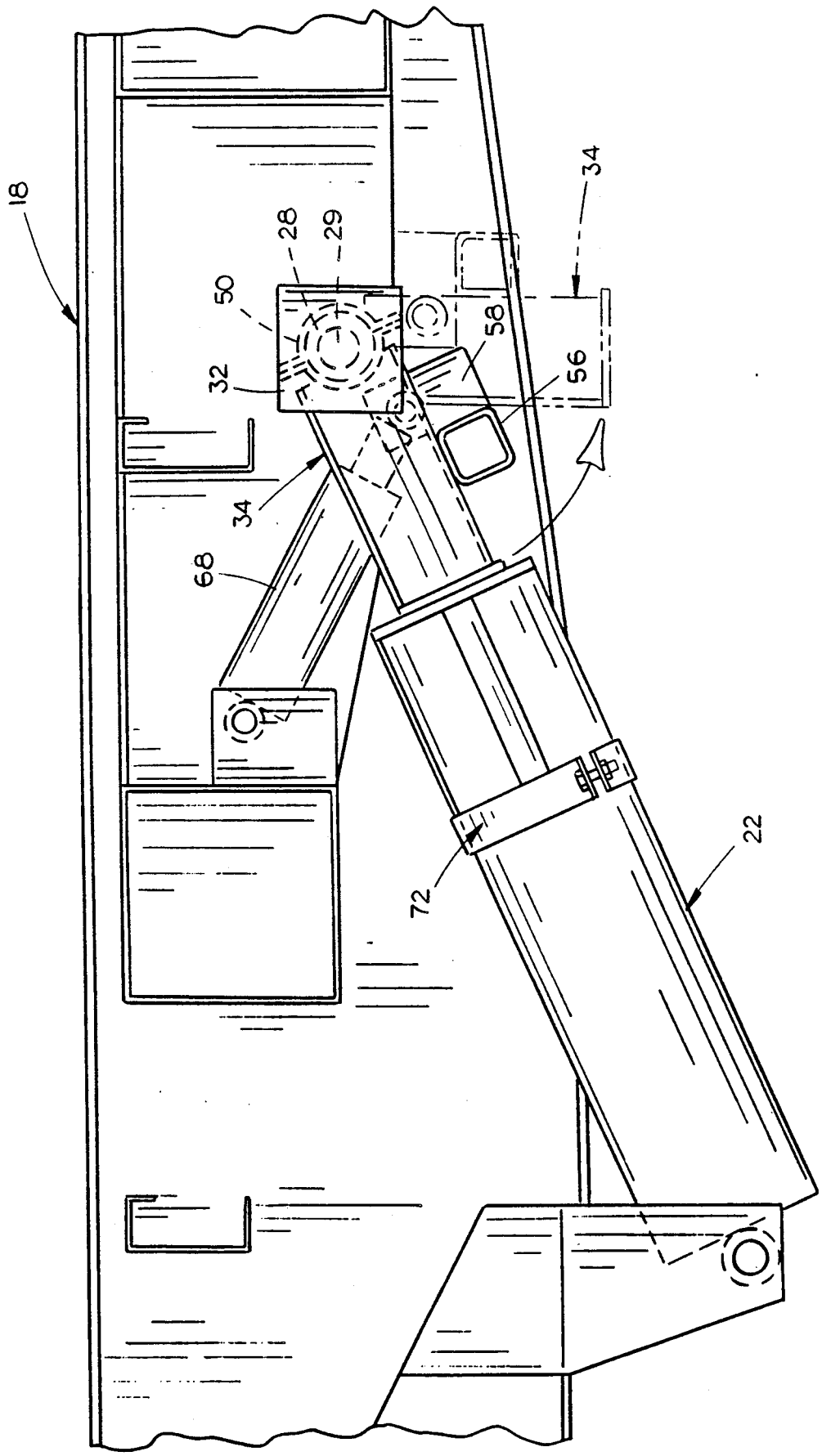
FIG. 3 is a side elevational view of the main tail lock of this invention.

A transversely extending tubular member 56 is secured to and extends between the locks 34 and 34'. Tubular member 56 is provided with a pair of spaced-apart brackets 58 and 60 secured thereto at the center length thereof which have pin 62 extending therebetween. Sleeve or collar 64 rotatably embraces pin 62 and is secured to the rearward end of rod 66 which extends from lock cylinder 68. The rear end of lock cylinder 68 is pivotally connected to the framework of tail 18 at 70. Thus, the extension of rod 66 from lock cylinder 68 causes the locks 34 and 34' to be pivoted about pin 28 in a counterclockwise direction as viewed in FIG. 3 or pivoted to the unlocked position as will be described in more detail hereinafter. Retraction of cylinder 66 into the cylinder 68 causes the locks 34 and 34' to pivotally move about pin 28 in a clockwise direction as viewed in FIG. 3 or moved to the locked position.

Figure 4:
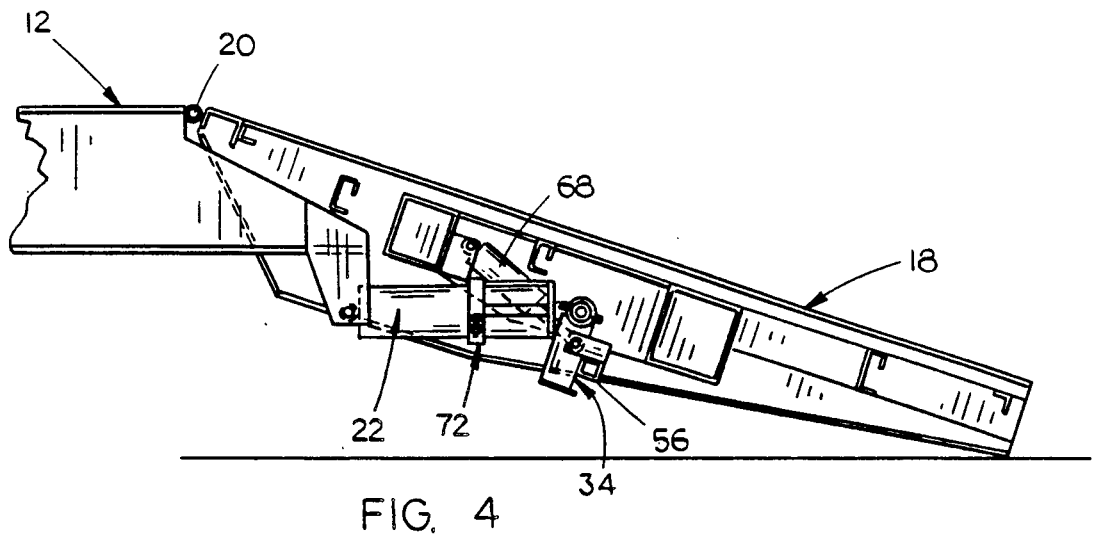
FIG. 4 is a side elevational view of the main tail in its lowered position with portions cut-away to more fully illustrate the invention.
Figure 5:
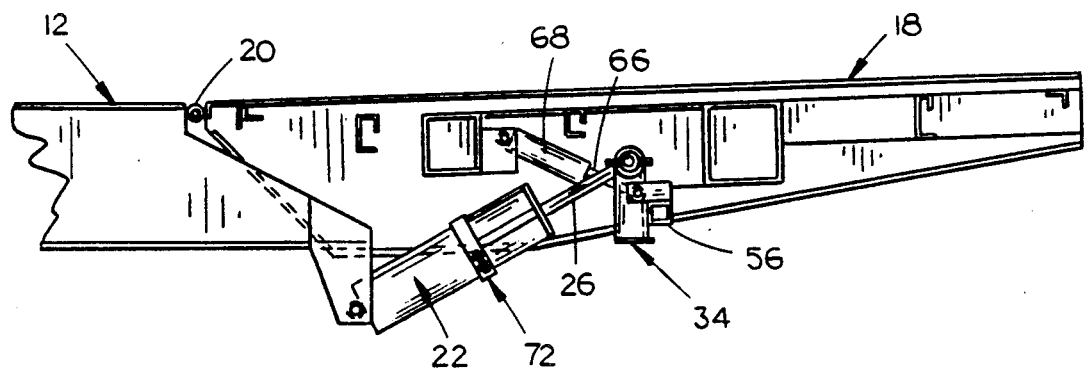
FIG. 5 is a view similar to FIG. 4 except that the main tail has been raised slightly above the horizontal to permit the main tail lock to be moved into its locked position.
Figure 6:
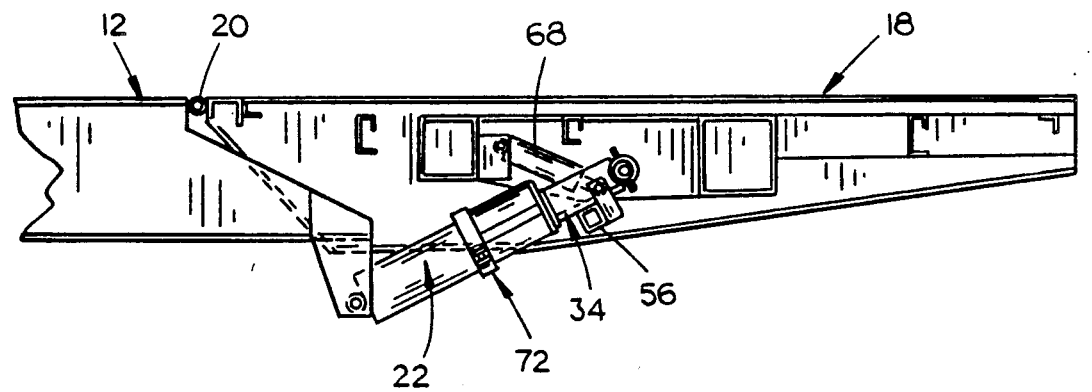
FIG. 6 is a view similar to FIG. 5 except that the main tail lock has been moved to its locked position and the main tail has been lowered to its transport position.

Assuming that the tail 18 is in its lowered condition (FIG. 4) and the locks 34 and 34' are in their unlocked condition, the method of locking the hydraulic cylinders 28 and 28' is as follows. The hydraulic cylinders 22 and 22' are extended to pivotally move the tail 18 slightly above (3-4") its normal raised position (FIG. 5). Lock cylinder 68 is then actuated to cause the retraction of cylinder 66 thereinto so that the locks 34 and 34' pivotally move from the unlocked position of FIG. 5 to the locked position of FIG. 6. The locks 34 and 34' are pivotally moved in a clockwise direction by the cylinder 68 until the rods 26 and 26', of the cylinders 22 and 22' respectively, are received within the openings 40 and 40' of locks 34 and 34' with the end plates 38 and 38' being positioned rearwardly of the gland ends of the cylinders 22 and 22'. The hydraulic cylinders 22 and 22' are then retracted to lower the tail 18 until the end plates 38 and 38' engage the gland ends of the cylinders 22 and 22'. Thus, in such a locked position, should the hydraulic cylinders 22 or 22' fail, or the associated hydraulic lines fail, the locks 34 and 34' are positioned between the ends of the cylinders 22 and 22' and the ends 28 and 28' so that further retraction of the cylinders 22 and 22' is prevented.

Although the locks 34 and 34' of this invention perform satisfactorily without any reinforcement of the gland ends of the tail cylinders, it is believed prudent to mount force dissipating devices 72 and 72' on the cylinders 22 and 22' respectively. Inasmuch as the devices 72 and 72' are identical, only device 72 will be described in detail with "'" being utilized on device 72' to indicate identical structure.

Device 72 includes a semi-circular end plate 74 having an opening 76 formed therein. A plurality of straps 76 are secured to the end plate 74 and extend rearwardly therefrom. Clamp 78 is secured to the rearward ends of the straps 76 and is adapted to be clamped onto the cylinder 22 and secured thereto by bolt 80. The device 72 is positioned on the cylinder 22 so that the end plate 74 is positioned adjacent the gland end of the cylinder 22. The end plate 38 of lock 34 engages plate 74 of device 72 so that the force imposed on the cylinder 22 by the lock 34 is dissipated or spread over a wider or greater area thereby ensuring that the gland end of cylinder 22 will not fail should undue forces be exerted on the gland end thereof by the lock 34.

When it is desired to lower the tail 18 for loading purposes, the hydraulic cylinders 22 and 22' are extended to raise the rear end of tail 18 somewhat (3-4") to enable the lock cylinder 68 to pivotally move the locks 34 and 34' to their unlocked condition. The hydraulic cylinders 22 and 22' are then retracted to permit the tail 18 to lower for loading purposes.

Thus it can be seen that a unique main tail lock has been provided for a hydraulic tail trailer which is much less complex than the prior art devices and which does not require substantial modification of the existing trailer tail. Further, the locking system of this invention cooperates with the hydraulic tail cylinders to ensure that the trailer tail will not be allowed to lower should the tail cylinders fail. Further, the locking system of this invention provides centerline support to the hydraulic tail. Thus it can be seen that the invention accomplishes at least all of its stated objectives.

We claim:

1. A trailer comprising,
    a wheeled frame means having rearward and forward ends and a support deck for supporting a load thereon,
    means on the forward end of said frame means for connecting said frame means to a prime mover,
    a tail means pivotally connected to the rearward end of said frame means and being pivotally movable between upper and lower positions,
    at least one tail hydraulic cylinder includes a cylinder body having a base end, a gland end and a cylinder rod extending rearwardly from said gland end, said base end being pivotally connected to said frame means,
    the rearward end of said cylinder rod of said tail hydraulic cylinder being pivotally secured to said tail means whereby said tail hydraulic cylinder may pivotally move said tail means relative to said frame means,
    a lock cylinder including a cylinder body having a base end, a gland end and a cylinder rod extending from the gland end thereof,
    the base end of said cylinder body of said lock cylinder being pivotally secured to said tail assembly,
    an elongated arm operatively pivotally secured to said ramp means and being disposed transversely with respect to a longitudinal axis of said lock cylinder,
    the cylinder rod of said lock cylinder being pivotally secured to said elongated arm for pivotally moving said elongated arm between first and second positions,
    and a lock member operatively secured to said elongated arm and being movable between locked and unlocked positions when said elongated arm is moved to its said first and second positions respectively,
    said lock member partially embracing said cylinder rod of said tail hydraulic cylinder when in its said locked position,
    said lock member having first and second ends,
    said first end of said lock member operatively engaging the gland end of said tail hydraulic cylinder when in its said locked position,
    said second end of said lock member operatively engaging the pivotal connection of said tail hydraulic cylinder rod with said ramp assembly when in its said locked position,
    the positioning of said lock member, when in its said locked position, between the gland end of said tail hydraulic cylinder and the pivotal connection of said tail hydraulic cylinder rod with said ramp assembly preventing retraction of said cylinder rod of said tail hydraulic cylinder to prevent accidental lowering of the tail means.

2. The trailer of claim 1 wherein a force dissipating means is secured to said tail hydraulic cylinder and has an end portion position closely adjacent the gland end of said tail hydraulic cylinder.

3. The trailer of claim 2 wherein a plurality of spaced-apart straps are secured to said end portion of said force dissipating means and extend towards the base end of said tail hydraulic cylinder, and means securing ends of said straps to said cylinder body of said tail hydraulic cylinder between the base and gland ends thereof.

* * * * *